Patented June 28, 1927.

1,634,113

UNITED STATES PATENT OFFICE.

ALLIBELLE HAZARD MOORE, OF KANSAS CITY, MISSOURI, ASSIGNOR OF ONE-HALF TO VICTOR L. PHILLIPS, OF KANSAS CITY, MISSOURI.

FOOD PRODUCT AND METHOD OF MAKING SAME.

No Drawing. Application filed September 4, 1924. Serial No. 735,871.

My invention involves not only a new food product but also the method of preparing the same. In the manufacture of the product I employ the outer covering of the grain kernel but without the use of any considerable amount of gluten or glutenous matter forming the inner portion of the kernel. The grain which I prefer to employ is wheat, and the food product is composed entirely of the outer covering or what is known as bran, and graham flour, or whole wheat flour which also contains a considerable percentage of bran.

As an important step in the process the ingredients are slightly baked and rendered substantially impervious to dampness, instead of being subjected to steam cooking or excessive heat.

The main object of the invention is to provide a wholesome, palatable and nutritious food which contains in the fullest measure the benefits to digestion, assimilation and elimination which are known to be possessed by bran and graham flour. In my improved food product there is retained the mineral salts and laxative properties of the outer covering of the wheat to a far larger degree, and gluten or glutenous matter to a far less degree, than in ordinary white flour. These outer coverings are used in the raw state and without the addition of sugar, fruits, other grains, binders or extraneous matter.

In carrying out my invention I utilize the outer coverings of the wheat kernels known as bran, and graham flour, taking about 50 to 60 per cent commercial bran and 40 to 50 percent of dry graham flour. These are well mixed and then slightly salted and dampened and placed in shallow pans which are lightly greased with animal or vegetable fat, a fat substitute, or shortening of any kind. The pans are then placed in a hot oven and the mixture is constantly stirred or agitated until the bran content is evenly baked or roasted. The thick mass of graham flour and bran which is somewhat of the nature of dough is converted into small flakes or granules by the baking and stirring. The heating in the greased pans renders the product practically impervious to moisture and at the same time crisp and sterilized.

The product may be eaten in loose form as prepared or with cream and sugar as a breakfast food, or in combination with other breakfast foods. It may be used as a filler for cakes, sprinkled on icings, frozen in ice cream, or incorporated in various other food products. The granules have a rich nutty taste, are crisp, and do not become flat or stale upon ordinary exposure.

It is important in my improved process that no white flour is added, and thus there is no gluten or glutenous matter incorporated, except such small amounts as are present in the graham flour. Whole wheat flour might be used in place of the graham flour but the latter being coarser ground is preferable. In the process I avoid such high temperatures and such excess of moisture as is present when products of this general character are toasted or are steamed or cooked in the presence of an excess of liquid.

As one important feature of my invention, I utilize the product above referred to for the preparation of a further food product which is also capable of all of the uses hereinbefore referred to. The granules formed by the baking of the mixture of graham flour and bran, and which have the graham flour and the bran adhering in flakes or particles may be further treated, preferably while still warm, by spraying and mixing with a syrup. This syrup may be made from cane sugar, maple sugar, malt sugar, brown sugar, or any other sweetening, heated or cooked to such a consistency that after spraying on or mixing with the particles, it will, upon cooling, form a coating of crystalline nature which will not be sticky or soft. This spraying or mixing process causes the original granules to adhere in the form of larger granules.

The product may also be used to form a confection. Maple sugar, brown sugar, malt sugar, chocolate, or other like material may be crushed or powdered and formed into a mass of creamy consistency with animal or vegetable fat or fat substitute or other shortening which may be thoroughly mixed with the baked granules by rolling, kneading or crushing to make the confection smooth and even. This may be rolled into slabs or cut into squares or other shapes, and may if desired be dipped into any suitable coating composition such as is used in the forming of confections. The confection may have fruit and nuts, or either of them, incorporated therein.

Instead of incorporating the baked granules in a body of plastic or creamy consistency in order to make the confection, I may add the bran flakes or granules prepared as above described, to a candy syrup which will harden to the desired extent upon cooling.

Having thus described my invention, what I claim as new and desire to secure by Letters Patent is:—

1. The process of preparing a food product which consists in mixing bran and graham flour, baking the same to form granules, and applying to said granules a cooked syrup which will harden to form a coating on the granules.

2. The process of preparing a food product which includes the steps of baking a raw cereal product containing bran to form granules, and treating the granules with a cooked syrup.

3. The process of preparing a cereal food product, which consists in mixing bran and graham flour particles, moistening, baking, and agitating while baking, to cause the particles to form granules and to prevent the formation of a cake.

4. The process of preparing a cereal food product, which consists in making a mixture of approximately 50% bran and approximately 50% graham flour, moistening, baking, and agitating while baking to prevent the formation of a single caked mass, but permitting the particles to adhere to form granules.

5. The process of preparing a cereal food product, which consists in making a mixture of approximately 50% bran and approximately 50% graham flour, moistening, baking, agitating while baking to prevent the formation of a single caked mass, but permitting the particles to adhere to form granules, and applying a cooked syrup which will harden to form a coating on said granules.

6. A baked cereal food product in the form of granules, each granule consisting of adhering particles of bran and graham flour in substantially equal proportions.

7. A baked cereal food product in the form of granules, each granule consisting of adhering particles of bran and graham flour in substantially equal proportions, and a cooked syrup coating on said granules.

Signed at Kansas City, in the county of Jackson and State of Missouri this 21st day of July, A. D. 1924.

ALLIBELLE HAZARD MOORE.